INVENTOR
FRANK ALEXANDER MILNE,
BY Hall & Houghton
ATTORNEY

INVENTOR
FRANK ALEXANDER MILNE
BY Hall & Houghton
ATTORNEY 3,056,858

TIME ASSIGNMENT SPEECH INTERPOLATION SYSTEMS AND TERMINAL EQUIPMENT THEREFOR

Frank Alexander Milne, Hadley Wood, Barnet, England, assignor to Her Majesty's Postmaster General, London, England Filed Aug. 7, 1961, Ser. No. 129,574
Claims priority, application Great Britain Aug. 24, 1960
7 Claims. (Cl. 179—15)

This invention relates to time assignment speech interpolation systems and terminal equipment therefor.

To transmit intelligible speech signals over long trunk telephone circuits is an operation requiring the use of amplifiers. Conversation is typically a two-way affair and amplifiers are usually unidirectional. Because of that incompatibility trunk circuits are, for the most part, two-channel, one "Go" and one "Return." That solution is very satisfactory in theory, but it is, however, uneconomic. When a pair of talkers use a trunk circuit at present, two telephone channels, one in each direction, are held by them for the duration of the call. In any reasonable conversation, only one speaker speaks at a time, and therefore only one channel is in use at a time and the other channel lies idle when it could earn revenue.

Figure 1:
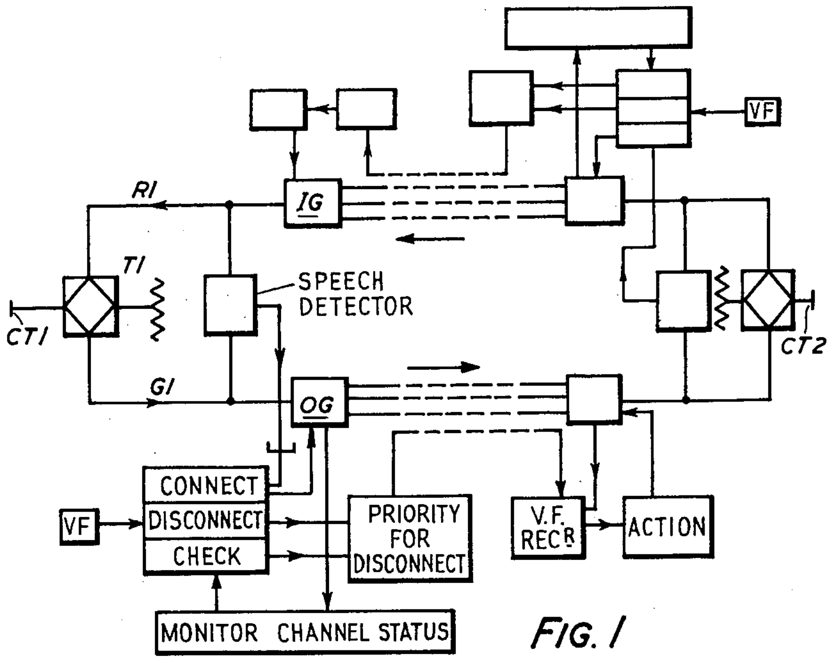

To economise in the use of channels, it has been proposed that a talker shall seize a channel in the appropriate direction only when he actually needs it for the transmission of speech signals, and that he shall release it (making it available to other talkers at his own end of the circuit) as soon as he ceases to need it, i.e. when he ceases speaking. The time assignment speech interpolation system provides facilities which enable the requisite connections and disconnections of channels to be made, and the system is shown in block schematic form in FIG. 1 of the accompanying drawings. FIG. 1 shows two audio circuits CT1, CT2, typical of a number of such circuits, each connected via its own hybrid transformer T1 to "Go" and "Return" channels, G1, R1 respectively, in turn connected via outgoing switch OG and incoming switch IG respectively to "Go" and "Return" channels of a long distance multi-channel circuit, for example, a transatlantic telephone cable.

Each pair of "Go" and "Return" channels G1, R1 is provided with a speech detector which, in conjunction with other control apparatus, enables a talker to be connected to a channel of the multi-channel circuit when he starts to speak and disconnects him when he ceases to speak. Further details of the system and the control apparatus are contained in U.S. Patent 2,907,829. The function of the speech detector is to decide when, and for how long, a channel in the multi-channel circuit is required by a talker. Ideally, the detector should be able to discriminate between genuine speech and noise or echoes (originated by incoming speech) giving a positive and rapid reaction over a volume range of 50 db or more. Once the presence of genuine outgoing speech is proved, a free channel in the multi-channel circuit is allotted and connected to the corresponding talkers at its two ends. A connection at the far end (the receiving end) is achieved by a method in which the channel to be used eventually for the speech is itself first made to carry VF signals indicating the listener to whom it is to be connected. The processes of detecting signalling and connecting take about 20 milli-seconds in all, and at present this time is cut from the beginning of a new speech transmission or "talk-spurt" and is known as an "initial clip."

Disconnection poses a rather different problem. It must take place at both ends of the channel but, until it has so taken place, the channel is connected and therefore cannot be used to transmit "disconnect signals." It is necessary to use a separate channel in the multi-channel circuit to control disconnect conditions for the entire group of channels in each direction. Both "connect" and "disconnect" are then under the control of the transmitting end, so that signals and speech are all subject to the same transmission delay, and each direction of transmission becomes a self-contained system independent of the other at least from the output of the speech detector onwards.

It may be arranged that an inactive talker does not release his last held channel by reason of his inactivity alone, but only if, by holding it, he is delaying (or may delay) its acquisition by a newly active talker.

Since one complete channel in each direction is set aside for disconnection signalling and since such signalling will not occupy the channel 100% of the time, it is convenient to use this same channel for "checking" signals for connections having priority.

Speech itself may be regarded as made up of "utterances" each containing one or more "talk-spurts" with gaps of various time durations between both "talk-spurts" and "utterances." It is found that an initial gap of 20 milliseconds is unnoticeable if it occurs only at the beginnings of complete "utterances," but if it prefaces every "talk-spurt" within the "utterance" itself, the loss of intelligibility is great. The situation is made worse if the speech is at a low level for then not only are the "talk-spurts" as measured by the speech detector shorter (since more of the speech energy drops below the threshold value) but the clips are lengthened by the time taken for the signal to build up to the threshold value at which the speech detector recognises it as speech. There is evidence to suggest that a 10 db drop in level is about equivalent to 30 milliseconds increase in clip time. It has been proposed to maintain the detector operated for a short time at the end of each "talk-spurt" with the idea of bridging the shorter gaps, and it has been suggested that a built-in "hangover" to the extent of 120 milli-seconds for normal "talk-spurts," reduced to 20 milli-seconds for short "talk-spurts," which are presumed to be, for the most part, isolated noise spikes, would be adequate. Such a "hangover" reduces the advantages to be gained from the system, and it is an object of the present invention to provide an improved speech detector for use in time assignment speech interpolation systems.

According to the present invention, line equipment for time assignment speech interpolation systems includes a speech detector providing, in use, a signal constant throughout a talk-spurt, the signal being fed to a circuit which delivers an output which decays gradually at the termination of a talk-spurt, and a parallel connected circuit providing, in use, an output whose maximum value is determined by the maximum amplitude by input signals reaching the circuit, which decays gradually at the end of the "talk-spurts," and a circuit for combining the two outputs in such manner that the output of the parallel-connected circuit opposes that of the detector.

The signal from the speech detector may be applied to a resistor-capacitor network whose time constant approximates to the longest "hangover" time which the detector is required to possess. The circuit may include a further resistor-capacitor network whose time constant is greater than the length of an average "talk-spurt" transmitted through the equipment.

The combined outputs may be connected to an amplifier which provides an output only when the combined outputs exceed a predetermined threshold value.

Means may also be provided for discharging the further resistor-capacitor network at the end of each "talk-spurt."

Figure 2:
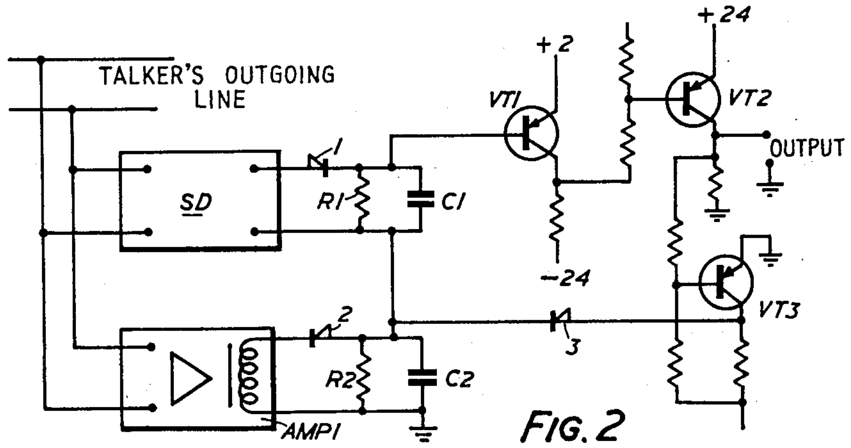

An embodiment of the invention will now be described in greater detail with reference to the accompanying drawings, of which FIG. 2 is a circuit diagram and FIGS. 3 to 11 are waveforms of signals occurring at different points in the circuit of FIG. 2.

A speech detector SD of conventional design is connected across a talkers' outgoing line circuit and provides a positive D.C. voltage output when the speech level on the line exceeds a predetermined threshold value which it is required to transmit. The detector has an inherent "hangover" time of about 20 milliseconds in order to maintain an output between successive cycles of the speech waveform on the outgoing line. The output of the detector is applied via a rectifier 1 to a resistor-capacitor combination R1, C1 as shown. The resistor-capacitor network has a time constant of the order of time required for the longest value of the "hangover."

In parallel connection with the speech detector is an amplifier AMP1, which produces an A.C. output voltage proportionally, linearly or otherwise, to the speech voltage on the outgoing line. The A.C. output is rectified by rectifier 2 and applied to a second resistor-capacitor combination R2, C2 having a larger time constant which is much greater than the duration of an average "talk-spurt." The output impedance of the amplifier AMP1 is very low, and therefore the voltage across R2, C2 is a close approximation to the peak voltage achieved during a "talk-spurt."

The outputs of the two networks R1, C1 and R2, C2 are connected together in series opposition and the resultant voltage is applied to a high gain D.C. amplifier comprising transistors VT1 and VT2. The amplifier gives an output only when the input voltage exceeds the threshold value, but, due to the high gain, the amplifier output rapidly reaches a limiting value, which is maintained until the input signal level falls below the threshold value.

The output of the amplifier is connected to control apparatus and serves to determine the connections and disconnections of channels in the multi-channel circuit. The instant at which the output of the D.C. amplifier falls to zero depends upon the signal level on the outgoing line circuit as will now be explained with reference to FIGS. 3 to 11.

Figures 3, 4, 5, 6, 7, 8, 9, 10, 11:
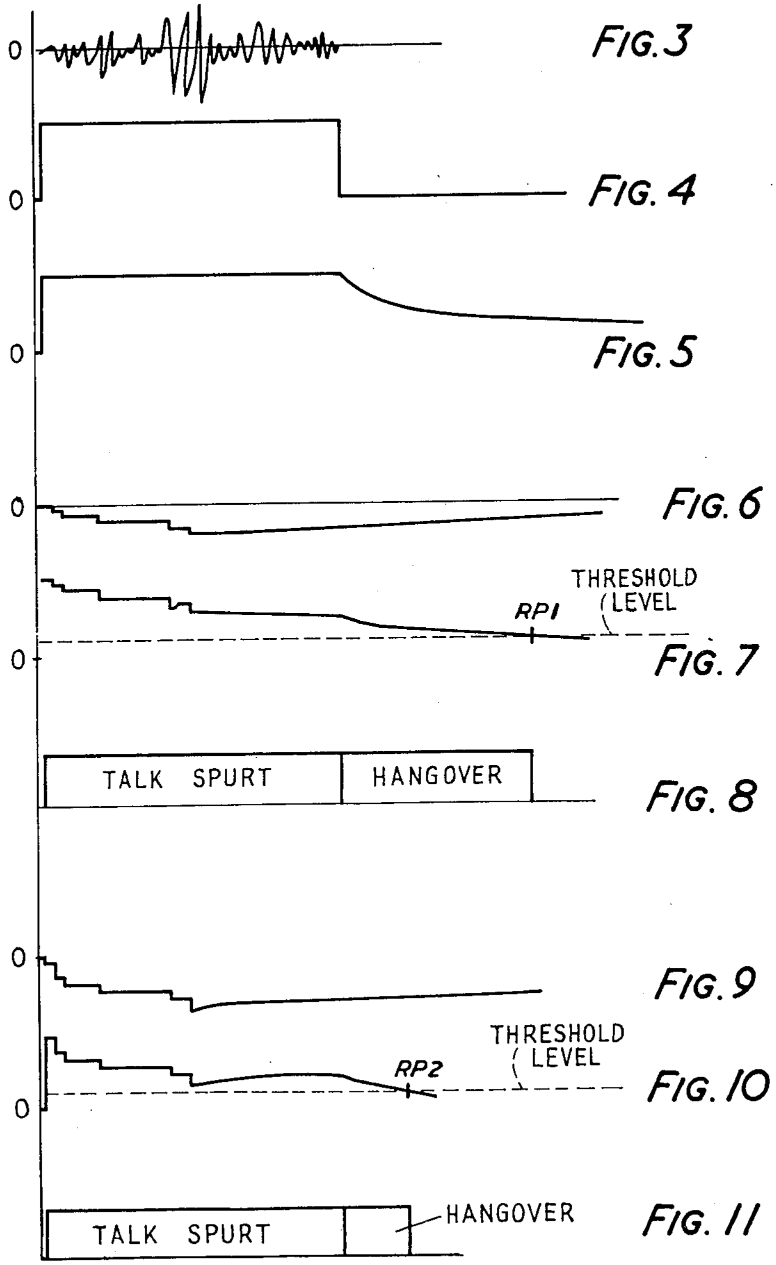

FIG. 3 is the waveform of a sample "talk-spurt" on the talkers' outgoing line circuit, and FIG. 4 represents the positive D.C. output of the speech detector. FIG. 4 also shows the initial clip. FIG. 5 shows the output of the network R1, C1.

FIG. 6 is the waveform of the negative output of the network R2, C2 resulting from a low level "talk-spurt." The stepped front at the beginning of the waveform illustrates the build-up to the peak voltage reached during the "talk-spurt."

FIG. 7 shows the addition of the waveforms of FIGS. 5 and 6, and also the threshold input level of the D.C. amplifier. The waveform of FIG. 7 crosses the threshold level at point RP1, which is the instant at which release of the channel is initiated. The waveform of FIG. 8 shows more clearly the time for which the channel is held due to the "talk-spurt" as well as the holding time due to hangover.

FIGS. 9 to 11 are waveforms corresponding with those of FIGS. 6 to 8 respectively for a high level speech signal on the talkers' outgoing circuit. With high level speech signals the negative output of the network R2, C2 is greater and the release point RP2 occurs earlier in time than RP1.

Succeeding "talk-spurts" may occur before network R2, C2 has fully discharged. In this case the "hangover" value of the subsequent "talk-spurt" may be determined by the level attained during the preceding spurt. Should that prove undesirable, an additional circuit, comprising transistor VT3 joined via rectifier 3 to the junction of networks R1, C1 and R2, C2 and to the collector of transistor VT2, discharges C2 when the output voltage of the D.C. amplifier is reduced to zero at the end of the "hangover" period. The length of "hangover" provided for any "talk-spurt" is thus determined solely by the level attained during that "talk-spurt." In addition, the voltage build-up across R2, C2 at the start of the "talk-spurt" is delayed until the speech detector has already operated the output circuit. That results in a faster transition from "off" to "on."

I claim:

1. Line equipment for time assignment speech interpolation systems comprising in combination a speech detector for providing an output constant in amplitude throughout a talk spurt, a first circuit connected to said speech detector for delivering a first output signal whose amplitude decreases gradually following the termination of a talk spurt, a second circuit for delivering a second output signal whose maximum amplitude is determined in accordance with the maximum amplitude of signals reaching said speech detector during a talk spurt and which decreases gradually at the end of each talk spurt, and connections from said first and second circuits to transmit said first and second output signals in opposition to a combining circuit and channel disconnect apparatus connected to receive the output of the combining circuit.

2. Line equipment for a time assignment speech interpolation system comprising in combination a speech detector having an input and an output for delivering an output constant in amplitude throughout a talk spurt, a first circuit having a time constant approximating to the longest hangover time which said speech detector is required to possess, connections from said speech detector to said first circuit, connections from said input of said speech detector to a signal deriving circuit for deriving a signal whose maximum amplitude is determined by the maximum amplitude of signals applied to said input terminals during a talk spurt, means for applying said derived signal to a second circuit having a time constant greater than the duration of an average talk spurt, electrical leads joining said first circuit and said second circuit in opposition to a signal combining circuit and channel disconnect apparatus connected to receive the output of said combining circuit.

3. Line equipment for a time assignment speech interpolation system comprising in combination a subscriber's outgoing circuit, a speech detector connected across said outgoing circuit for delivering an output constant in amplitude throughout a talk spurt, a first circuit having a time constant approximating to the longest hangover time of said speech detector, connections from said speech detector to said first circuit, an amplifier connected across said outgoing circuit, a second circuit having a time constant greater than the duration of an average talk spurt, connections from said amplifier to said second circuit, leads connecting the outputs of said first and second circuits in opposition to a combining circuit and channel disconnect apparatus connected to receive the output of said combining circuit.

4. Line equipment for a time assignment speech interpolation system comprising in combination a subscriber's outgoing circuit, a speech detector connected across said outgoing circuit for delivering an output constant in amplitude throughout a talk spurt, a first circuit having a time constant approximating to the longest hangover time of said speech detector, connections from said speech detector to said first circuit, an amplifier connected across said outgoing circuit, a second circuit having a time constant greater than the duration of an average talk spurt, connections from said amplifier to said second circuit, leads connecting the outputs of said first and second circuits in opposition to a further amplifier providing an output only when the opposed inputs exceed a threshold value and channel disconnect apparatus connected to receive the output of said further amplifier.

5. Line equipment for a time assignment speech interpolation system comprising in combination an outgoing circuit for each subscriber, and, for each outgoing circuit, a speech detector connected across said outgoing circuit for delivering an output constant in amplitude throughout a talk spurt, a first resistor-capacitor combination having a time constant approximating to the longest hangover time of said speech detector, connections from the output of said speech detector to said first resistor-capacitor combination, an amplifier connected across said outgoing circuit and, fed by said amplifier, a second resistor-capacitor combination having a time constant greater than the duration of an average talk spurt, leads connecting the outputs of said first and second resistor-capacitor combinations in opposition to a combining circuit and channel disconnect apparatus connected to receive the output of the combination circuit.

6. Line equipment for a time assignment speech interpolation system comprising in combination an outgoing circuit for each subscriber, and, for each outgoing circuit, a speech detector connected across said outgoing circuit for delivering an output constant in amplitude throughout a talk spurt, a first resistor-capacitor combination having a time constant approximating to the longest hangover time of said speech detector, connections from the output of said speech detector to said first resistor-capacitor combination, an amplifier connected across said outgoing circuit and, fed by said amplifier, a second resistor-capacitor combination having a time constant greater than the duration of an average talk spurt, a discharge circuit connected to said second resistor-capacitor combination for discharging the latter when the output of the amplifier falls to zero, leads connecting the outputs of said first and second resistor-capacitor combinations in opposition to a combining circuit and channel disconnect apparatus connected to receive the output of the combination circuit.

7. Line equipment for a time assignment speech interpolation system comprising in combination a speech detector having an input and an output for delivering an output constant in amplitude throughout a talk spurt, a first circuit having a time constant approximating to the longest hangover time which said speech detector is required to possess, connections from said speech detector to said first circuit, connections from said input of said speech detector to a signal deriving circuit for deriving a signal whose maximum amplitude is determined by the maximum amplitude of signals applied to said input terminals during a talk spurt, means for applying said derived signal to a second circuit having a time constant greater than the duration of an average talk spurt, a discharge circuit connected to said second circuit for discharging the latter when the output of said signal deriving circuit drops to zero, electrical leads joining said first circuit and said second circuit in opposition to a signal combining circuit and channel disconnect apparatus connected to receive the output of said combining circuit.

No references cited.